US007545450B2

(12) United States Patent
Tsai et al.

(10) Patent No.: US 7,545,450 B2
(45) Date of Patent: Jun. 9, 2009

(54) DISPLAY DEVICE COMPRISING ELECTROSTATIC DISCHARGE PROTECTION CIRCUITS, EACH CIRCUIT HAVING ONE END CONNECTED TO FIRST AND SECOND CONDUCTING WIRES AND ANOTHER END CONNECTED TO A CORRESPONDING SIGNAL LINE

(75) Inventors: Shu-Fen Tsai, Chiayi (TW); Ching-Chuan Chen, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 275 days.

(21) Appl. No.: 11/438,355

(22) Filed: May 23, 2006

(65) Prior Publication Data

US 2007/0103423 A1 May 10, 2007

(30) Foreign Application Priority Data

Nov. 9, 2005 (TW) .............................. 94139335 A

(51) Int. Cl.
*G02F 1/1333* (2006.01)
*G02F 1/1343* (2006.01)

(52) U.S. Cl. .............................. 349/40; 349/54; 349/55

(58) Field of Classification Search ................... 349/40, 349/148

See application file for complete search history.

(56) References Cited

U.S. PATENT DOCUMENTS

| | | | | |
|---|---|---|---|---|
| 5,909,035 | A | 6/1999 | Kim | |
| 6,566,902 | B2 | 5/2003 | Kwon et al. | |
| 6,696,701 | B2 | 2/2004 | Hector et al. | |
| 2002/0044227 | A1 * | 4/2002 | Lee | 349/40 |
| 2002/0075419 | A1 * | 6/2002 | Kwon et al. | 349/40 |
| 2003/0122989 | A1 | 7/2003 | Park et al. | |
| 2004/0257511 | A1 * | 12/2004 | Song et al. | 349/141 |
| 2005/0225688 | A1 * | 10/2005 | Park et al. | 349/40 |
| 2006/0050219 | A1 * | 3/2006 | Lee | 349/141 |

* cited by examiner

*Primary Examiner*—Andrew Schechter
*Assistant Examiner*—Charles Chang
(74) *Attorney, Agent, or Firm*—Birch, Stewart, Kolasch & Birch, LLP

(57) ABSTRACT

A display device and a configuration of common electrode thereof are provided. The display device and the configuration of common electrode thereof are used for dividing the common electrode connected to an electrostatic discharge protection circuit into two conducting wires and electrically connecting two conducting wires between two corresponding adjacent signal lines to form a net structure. Thus, the aforementioned configuration is able to repair the short circuits occurring between several common electrodes and several signal lines, thereby increasing the yield rate of the display device.

4 Claims, 5 Drawing Sheets

DISPLAY DEVICE COMPRISING ELECTROSTATIC DISCHARGE PROTECTION CIRCUITS, EACH CIRCUIT HAVING ONE END CONNECTED TO FIRST AND SECOND CONDUCTING WIRES AND ANOTHER END CONNECTED TO A CORRESPONDING SIGNAL LINE

This application claims the benefit of Taiwan application Serial No. 94139335, filed Nov. 9, 2005, the subject matter of which is incorporated herein by reference.

BACKGROUND OF THE INVENTION

1. Field of the Invention

The invention relates in general to a liquid crystal display device and a configuration of common electrode thereof, and more particularly to liquid crystal display device and a configuration of common electrode thereof having electrostatic discharge protection circuits.

2. Description of the Related Art

Electrostatic discharge is an accumulation of static electricity and occurs when electrostatic charges are shifted between different objects. The occurrence of electrostatic discharge is instant and is measured at nano-seconds. Within such a short instance, the static electricity will have currents as high as several amperes. When such a high current flows through a semiconductor, the semiconductor will be damaged. For example, in an ordinary thin-film-transistor (TFT) liquid crystal display device, the common electrode on the glass substrate is formed on a first metal layer, while the data line is formed on a second metal layer. The metal of the first layer and the metal of the second layer are separated by an oxide layer. When the above static electricity occurs to the data line and the common electrode, the high current generated by the static electricity would penetrate the oxide layer when flowing through the crossing area between the data line and the common electrode and cause short circuits to the first metal layer and the second metal layer.

Referring to FIG. 1, a repairing configuration of a conventional liquid crystal display device is shown. The liquid crystal display device 100 has a glass substrate 102. The glass substrate 102 has several data lines DL(1)~DL(N), a common electrode COM, several electrostatic discharge protection circuits ESD 104(1)~104(N) and a pixel array 106 disposed thereon, wherein N is a positive integer. The electrostatic discharge protection circuits 104(1)~104(N) are respectively bridged between their corresponding data lines DL and the common electrode COM. The electrostatic discharge protection circuits 104(1)~104(N) are used for resolving the electrostatic discharge occurring on the data lines DL or the common electrode COM. The pixel array 106 includes a number of pixels (not shown in FIG. 1). The pixels are electrically connected to their corresponding data lines DL, respectively. The two sides of the common electrode COM are both coupled to the common electrode voltage Vcom. The routings of the data lines DL(1)~DL(N) on the glass substrate 102 all cross over the common electrode COM. When static electricity occurs to the second data line DL(2), the high current generated by the static electricity would cause short circuit to the second data line DL(2) and the common electrode COM at a short circuit point S1 shown in FIG. 1. The way of repairing is to cut off the common electrode COM at the two sides of the short circuit point S1 by laser to maintain the normal transmission of signals on the second data line DL(2). However, when another static electricity occurs to the third data line DL(3) and causes short circuit to the third data line DL(3) and the common electrode COM at a short circuit point S2 shown in FIG. 1, the third electrostatic discharge protection circuit 104(3) will not be coupled to the common electrode voltage Vcom if the common electrode COM is cut off by laser at the two sides of the short circuit point S2. Thus, the third electrostatic discharge protection circuit 104(3) is unable to operate normally. In other words, the second short circuit point S2 will make the display device 100 unreparable and become a defect.

Therefore, if more than two short circuits occur to the same signal line of the display device adopting the aforementioned configuration, then one of the short circuits can not be repaired. Consequently, the yield rate of the display device is decreased, thereby increasing the manufacturing cost of the display device.

SUMMARY OF THE INVENTION

It is therefore an object of the invention to provide a display device and a configuration of common electrode thereof for repairing the short circuits occurring between several common electrodes and several signal lines, thereby increasing the yield rate of the display device.

The invention achieves the above-identified object by providing a display device. The display device at least includes a pixel, a signal line, a driving circuit, a first conducting wire, a second conducting wire, a first conducting element, and a second conducting element. The signal line is electrically connected to the pixel. The driving circuit drives the pixel by the signal line. Both the first conducting wire and the second conducting wire cross over the signal line. Both the two ends of the first conducting wire and the two ends of the second conducting wire are coupled to a constant voltage. The constant voltage is a common electrode voltage. The first conducting element and the second conducting element are connected by the first and the second conducting elements, the first and the second conducting elements are positioned at two opposite sides of the signal line. The display device further includes an electrostatic discharge protection circuit. One end of the electrostatic discharge protection circuit is coupled to the first conducting wire and the second conducting wire, while the other end of the electrostatic discharge protection circuit is coupled to the signal line.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a display device and a configuration of common electrode thereof. According to the invention, the common electrode connected to an electrostatic discharge protection circuit is divided into two conducting wires, and the two conducting wires are connected by a number of conducting elements, each of which is positioned between two corresponding adjacent signal lines to form a net structure. Thus, the aforementioned configuration is able to repair the short circuits occurring between several common electrodes and several signal lines, thereby increasing the yield rate of the display device and reducing the manufacturing cost.

FIRST EMBODIMENT

Figure 1:
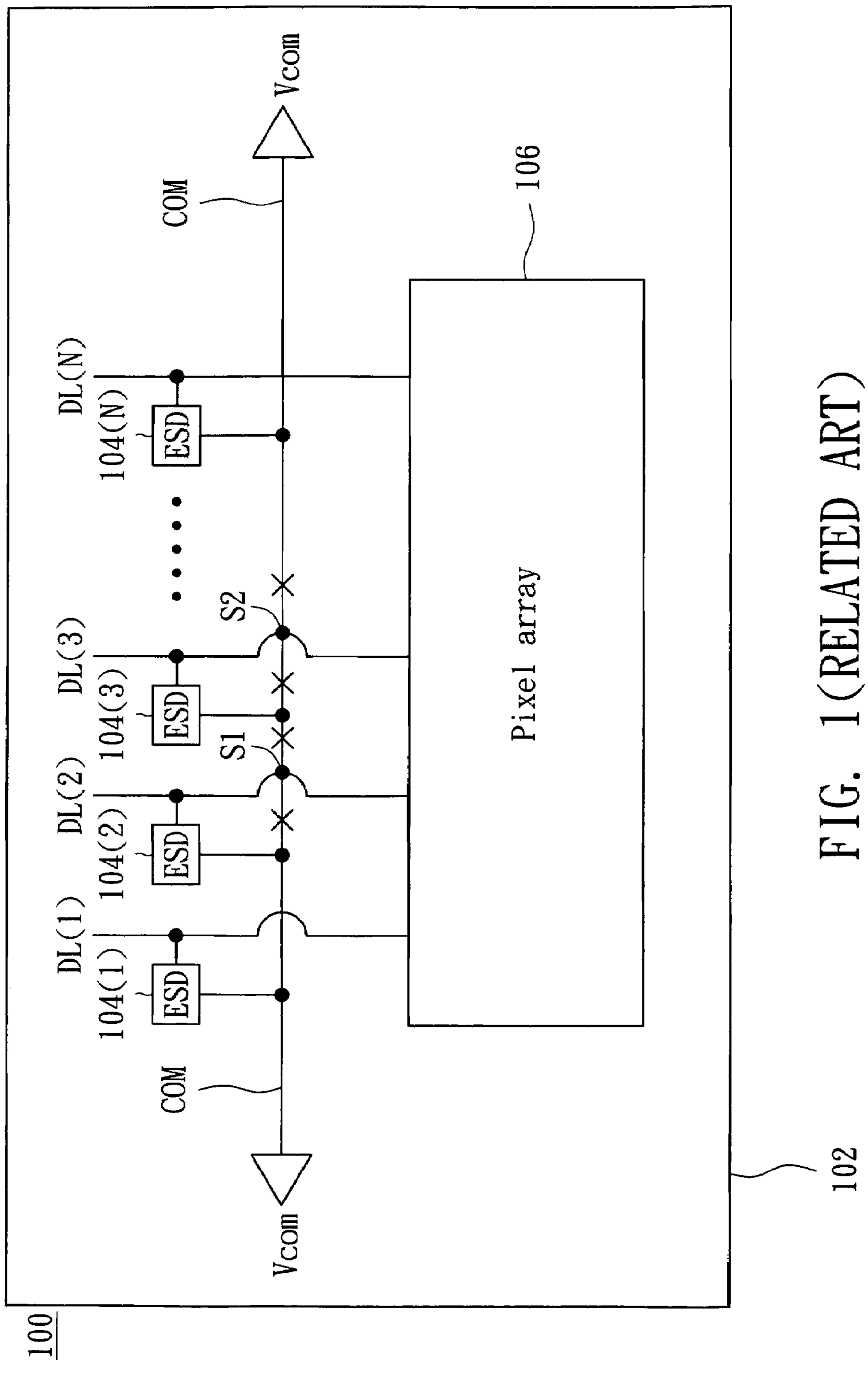
FIG. 1(RELATED ART)
FIG. 1 illustrates a repairing configuration of a conventional liquid crystal display device.
Figure 2A:
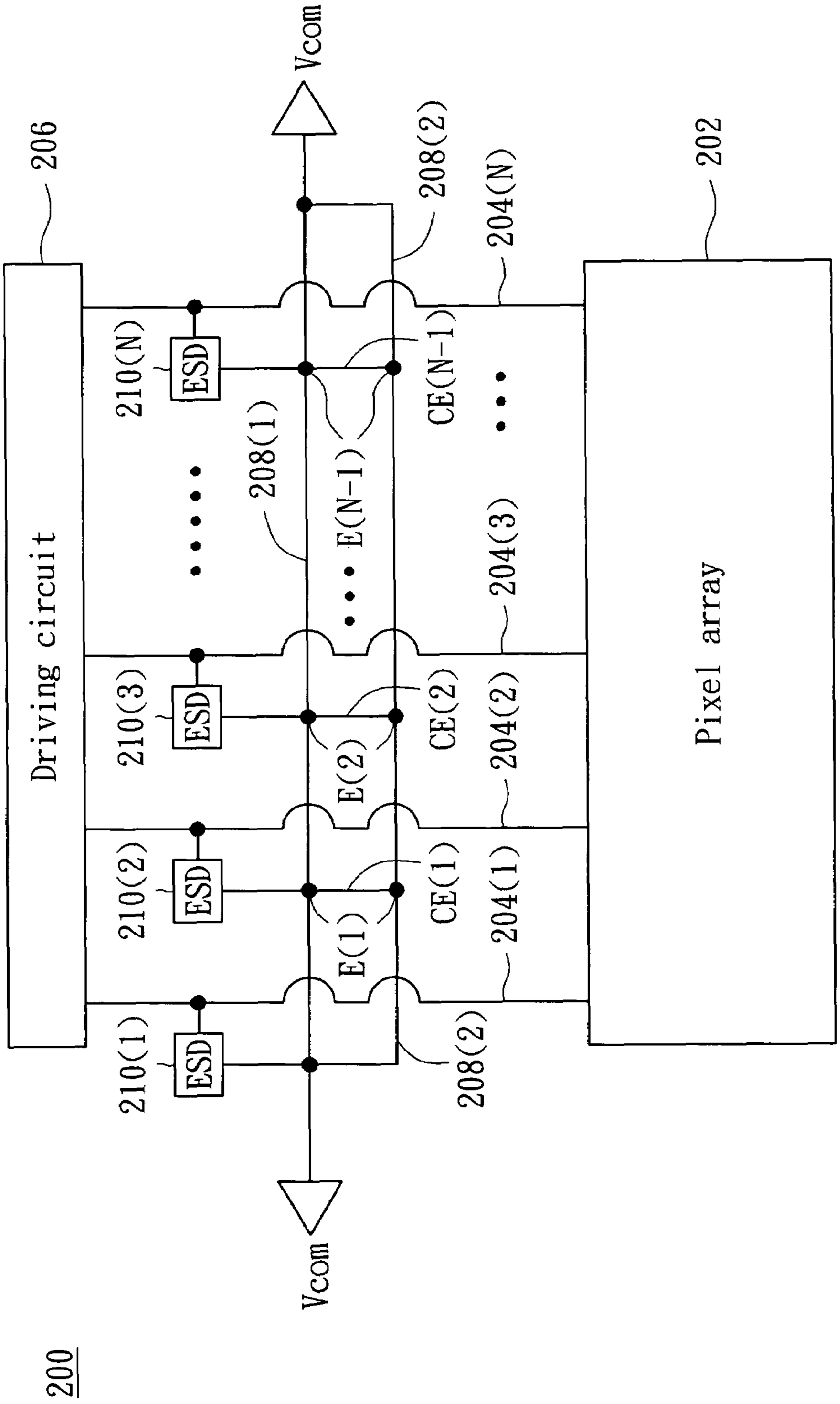
FIG. 2A illustrates a repairing configuration of a display device according to a first embodiment of the invention.

Referring to FIG. 2A, a repairing configuration of a display device according to a first embodiment of the invention is shown. Examples of the display device 200 include a TFT liquid crystal display device having a pixel array 202, several signal lines 204(1)~204(N), a driving circuit 206, a first conducting wire 208(1), a second conducting wire 208(2), conducting elements CE(1)~CE(N−1), and several electrostatic discharge protection circuits 210(1)~210(N), wherein N is a positive integer. The pixel array 202 includes several pixels, several signal lines 204(1)~204(N) and a scan circuit. The structure of the pixel array 202 is not shown in FIG. 2A. Examples of the driving circuit 206 include at least one data driving circuit. Examples of the signal lines 204(1)~204(N) include data lines. The driving circuit 206 drives the pixels of the pixel array 202 by the signal lines 204(1)~204(N). The first conducting wire 208(1) and the second conducting wire 208(2) are both a common electrode disposed to cross under the signal lines 204(1)~204(N) and are connected by the conducting elements CE(1)~CE(N−1). Each of the conducting elements CE(1)~CE(N−1) is positioned at two opposite sides of the corresponding signal line 204, or positioned between two corresponding adjacent signal lines 204 respectively. For example, the conducting element CE(1) is positioned between the first data line 204(1) and the second data line 204(2). The conducting element CE(1) connects first conducting wire 208(1) and the second conducting wire 208 (2) and form a first electrical connection point E(1). The electrostatic discharge protection circuits 210(1)~210(N) are respectively bridged between their corresponding data lines 204 and the common electrode, that is, the first conducting wire 208(1) and the second conducting wire 208(2). The electrostatic discharge protection circuits 210(1)~210(N) are used for relieve the electrostatic discharge occurring on the data line 204 or the common electrode. For example, one end of the second electrostatic discharge protection circuit 210(2) is electrically connected to the first electrical connection point E(1), while the other end of the electrostatic discharge protection circuit 210(2) is electrically connected to the second data line 204(2). Besides, the two ends of the first conducting wire 208(1) and the second conducting wire 208(2) are both coupled to the common electrode voltage Vcom.

Figure 2B:
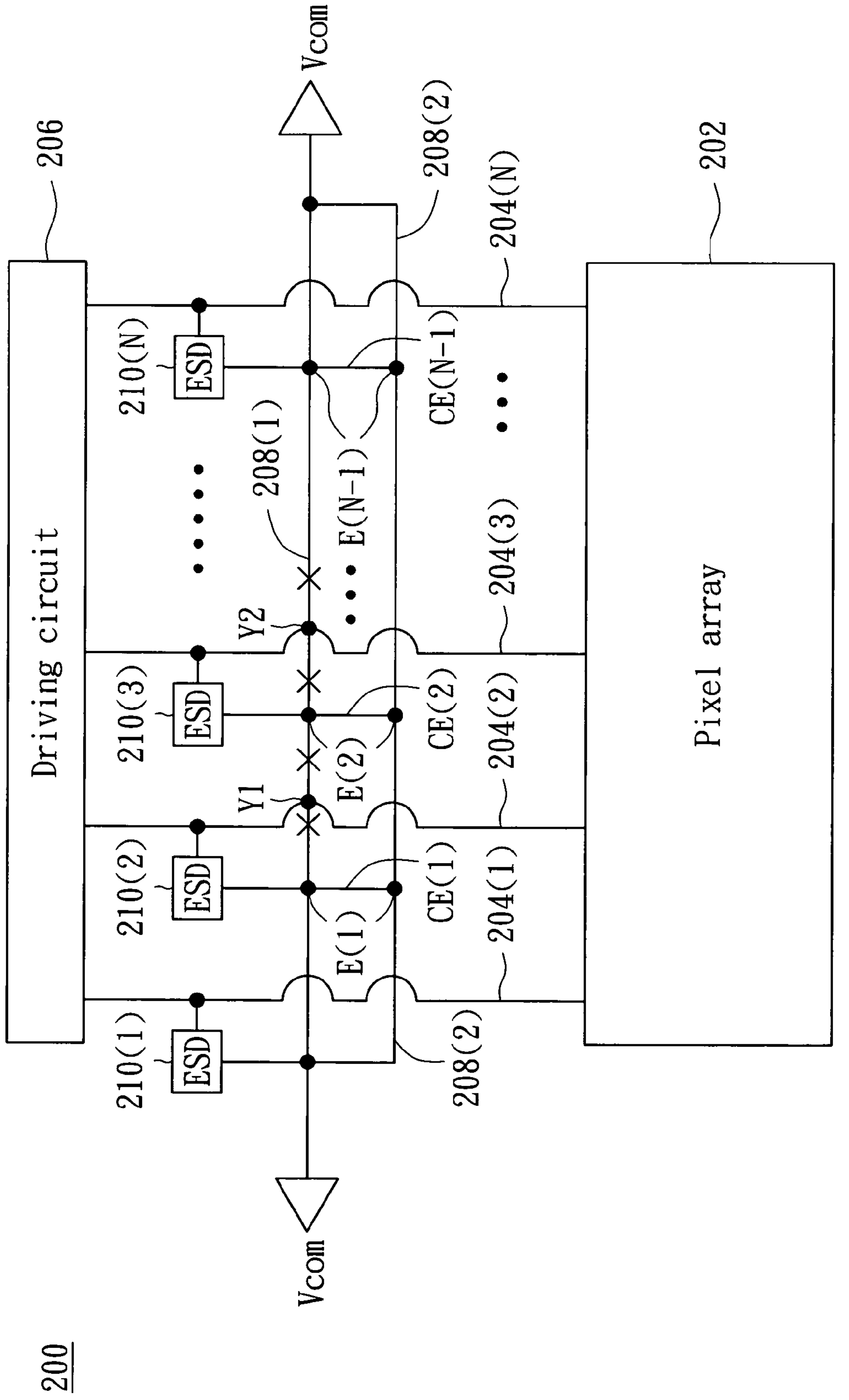
FIG. 2B illustrates the repaired display device according to the first embodiment.

Referring to FIG. 2B, the repaired display device is shown according to the first embodiment. When static electricity occurs to the second data line 204(2), the high current generated by the static electricity would cause short circuit to the second data line 204(2) and the common electrode at the crossing point between the first conducting wire 208(1) and the second data line 204(2), that is, the short circuit point Y1 shown in FIG. 2B. The first conducting wire 208(1) is cut off by laser at the two sides of the second data line 204(2), so that the pixel voltage outputted by the driving circuit 206 is able to be transmitted to the second data line 204(2) normally. When another static electricity occurs to the third data line 204(3), short circuit would occur to the third data line 204(3) and the first conducting wire 208(1) at the short circuit point Y2 shown in FIG. 2B. Similarly, the first conducting wire 208(1) is cut off by laser at the two sides of the third data line 204(3) to maintain normal transmission of signals.

It is noted that under the configuration of the invention, when the first conducting wire 208(1) is cut into several segments when short circuits occur to the signal line 204, the third electrostatic discharge protection circuit 210(3) coupled to the separated first conducting wire 208(1) still can be coupled to the common electrode voltage Vcom via the second conducting wire 208(2). Thus, the third electrostatic discharge protection circuit 210(3) still can operate normally. In other words, the second short circuit point will not make the display device 200 unreparable and become a defect.

SECOND EMBODIMENT

Figure 3A:
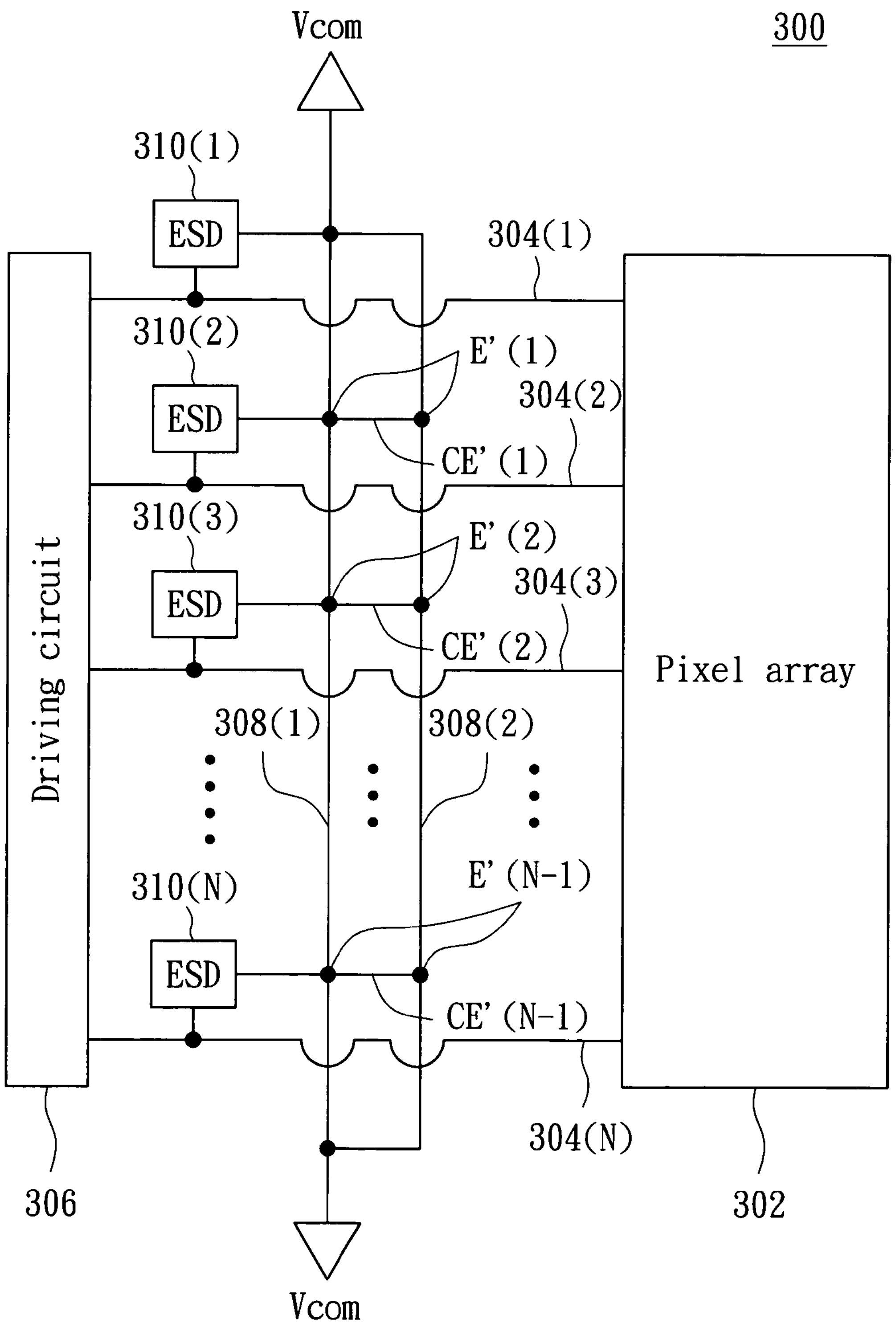
FIG. 3A illustrates a repairing configuration of a display device according to a second embodiment of the invention.

The aforementioned driving circuit in the first embodiment is exemplified by the data driving circuit, while the signal line is exemplified by data lines. The driving circuit includes at least one scan driving circuit and the signal lines include scan lines in the second embodiment. Referring to FIG. 3A, a repairing configuration of a display device according to a second embodiment of the invention is shown. The display device 300 is also exemplified by a TFT liquid crystal display device having a pixel array 302, several signal lines 304(1) ~304(N), a driving circuit 306, a first conducting wire 308(1), a second conducting wire 308(2), conducting elements CE'(1)~CE'(N−1), and several electrostatic discharge protection circuits 310(1)~310(N), wherein N is a positive integer. The pixel array 302 includes a number of pixels, a number of the aforementioned signal lines 304 and a number of the aforementioned data lines. The driving circuit 306 is a scan driving circuit, and the signal lines 304(1)~304(N) are a scan circuit. The driving circuit 306 drives the pixel array 302 by the signal line 304(1)~304(N). The first conducting wire 308(1) and the second conducting wire 308(2) are a common electrode, that is, both the two ends of the first conducting wire 308(1) and the two ends of the second conducting wire 308(2) receive the common electrode voltage Vcom. Besides, both the first conducting wire 308(1) and the second conducting wire 308(2) cross under the signal lines 304(1)~304(N) and are connected by the conducting elements CE'(1)~CE'(N−1), each of which are positioned between two corresponding adjacent signal lines 304. The conducting elements CE'(1)~CE'(N−1) form the electrical connection points E'(1)~E'(N−1) shown in FIG. 3A. The electrostatic discharge protection circuits 310(1) ~310(N) respectively cross over their corresponding signal lines 304 and the common electrode, that is, the first conducting wire 308(1) and the second conducting wire 308(2).

Figure 3B:
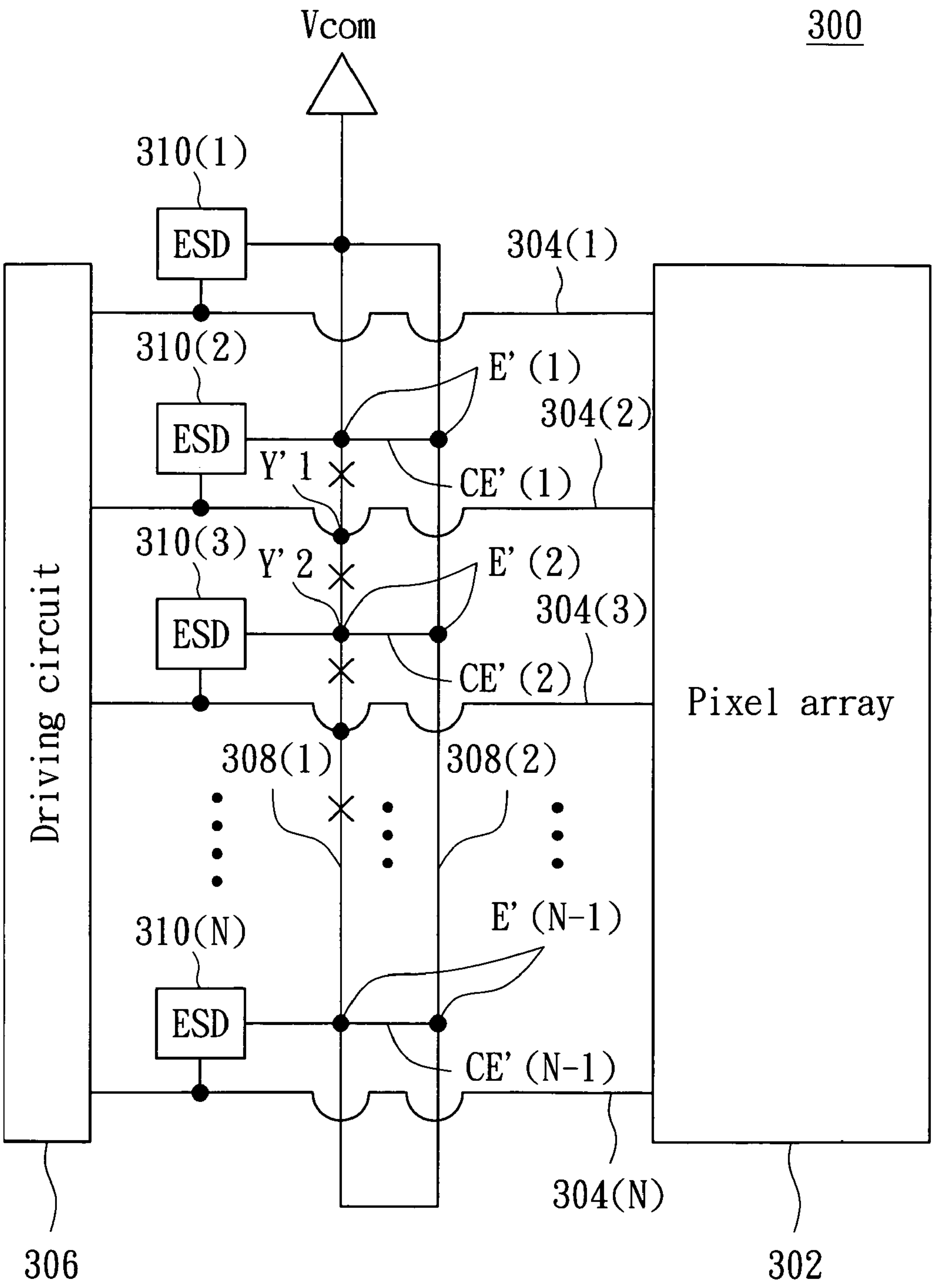
FIG. 3B illustrates the repaired display device according to the second embodiment.

Referring to FIG. 3B, the repaired of the display device according to the second embodiment is shown. According to the present embodiment of the invention, the common electrode connected to an electrostatic discharge protection circuit is divided into two conducting wires, namely, the first conducting wire 308(1) and the second conducting wire 308 (2). The two conducting wires are connected by the conducting elements CE'(1)~CE'(N−1), each of which is positioned between two corresponding adjacent signal lines 304 to form a net structure. Thus, the short circuits occurring between the common electrode and the signal line can be repaired. For example, when static electricity occurs to the second data line 304(2), the high current generated by the static electricity would cause short circuit to the second data line 304(2) and the common electrode, such as at the crossing point between the first conducting wire 308(1) and the second data line 304(2), that is the short circuit point Y'1 shown in FIG. 3B. The first conducting wire 308(1) is cut off by laser at the two sides of the second data line 304(2), so that the normal transmission of signals on the second data line 304(2) can be maintained. When another static electricity occurs to the third data line 304(3) and causes short circuit to the third data line 304(3) and the first conducting wire 308(1) at the short circuit point Y'2 shown in FIG. 3B. Similarly, the first conducting wire 308(1) is cut off by laser at the two sides of the third data line 304(3). The third electrostatic discharge protection circuit 310(3) is coupled to the common electrode voltage Vcom via the second conducting wire 308(2), lest the electrostatic discharge can not be relieved when the first conducting wire 308(1) is cut off.

In the above embodiments of the invention, the display devices 200 and 300 are exemplified by a TFT liquid crystal display device. However, examples of the above display devices also include an organic light emitting diode (OLED) display device. The configuration of the embodiment of the invention (that is, the single common electrode coupled to the electrostatic discharge protection circuit is divided into two conducting wires and the two conducting wires are connected by the conducting elements, each of which is positioned between two corresponding adjacent signal lines to form a net structure), is also applicable to the connection between the pixels and the common electrode. For example, the pixels are electrically connected to two common electrode lines at the same time, so that when one of the common electrode lines is out of order, such as having short circuit with other the conducting wire of other layers for instance, the pixels can receive common electrode voltage via the other common electrode line.

According to the display device and configuration of common electrode thereof disclosed in the above embodiments of the invention, the common electrode is divided into two conducting wires which are connected by a number of conducting elements, each of which is positioned between two corresponding adjacent signal lines to form a net structure. Thus, when a number of short circuits occur to the common electrode, the common electrode still can be repaired to increase the yield rate of the display device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:

a plurality of pixels;

a plurality of signal lines electrically connected to the corresponding pixels;

a driving circuit for driving the pixels through the signal lines;

a first conducting wire and a second conducting wire, both of which cross over the signal lines, wherein both two ends of the first conducting wire and two ends of the second conducting wire are physically connected to a constant voltage; and a plurality of conducting elements, wherein the first conducting wire and the second conducting wire are physically connected by the conducting elements, and each conducting element is positioned between two corresponding adjacent signal lines;

a plurality of electrostatic discharge protection circuits, each electrostatic discharge protection circuit having one end electrically connected to the first conducting wire and the second conducting wire, and another end electrically connected to a corresponding signal line.

2. The display device according to claim 1, wherein the constant voltage is a common electrode voltage.

3. The display device according to claim 1, wherein the driving circuit is a data driving circuit, and the signal lines are data lines.

4. The display device according to claim 1, wherein the driving circuit is a scan driving circuit, and the signal lines are scan lines.

* * * * *